United States Patent [19]

Juengel et al.

[11] 4,328,623
[45] May 11, 1982

[54] TELEMETRY GAGE SYSTEM

[75] Inventors: Richard O. Juengel, Romeo; John D. Begin, Warren; John Khalaf, Livonia, all of Mich.

[73] Assignee: The Valeron Corporation, Troy, Mich.

[21] Appl. No.: 182,226

[22] Filed: Aug. 28, 1980

[51] Int. Cl.³ .............................................. G01B 7/28
[52] U.S. Cl. ............................ 33/174 L; 33/174 PC; 33/169 R
[58] Field of Search ........... 33/174 L, 174 PC, 172 E, 33/169 R, 174 R, 174 P, 174 Q

[56] References Cited

U.S. PATENT DOCUMENTS 3,573,444  4/1971  Kawabata ....................... 33/174 L
4,115,923  9/1978  Smith et al. ...................... 33/174 L
4,118,871  10/1978 Kirkham ........................ 33/174 PC
4,255,862  3/1981  Nakamura ....................... 33/174 L Primary Examiner—Willis Little
Attorney, Agent, or Firm—Gordon K. Harris, Jr.

[57] ABSTRACT

An optically coupled in-process gaging system is disclosed for use with numerically controlled machine tools wherein a battery-powered gage unit is enclosed in a housing adapted for retention in an automatic NC program controlled selection from the NC tool magazine. The gage unit can be placed in a machine tool device, such as a spindle, whose movement is directed by the NC program to place a gage transducer of the gage unit in contact with a workpiece to perform dimensional gaging. The gage unit converts an electrical transducer signal into an infra-red optical FM signal for wireless transmission to a receiver unit coupled to a microcomputer-based control unit.

10 Claims, 5 Drawing Figures

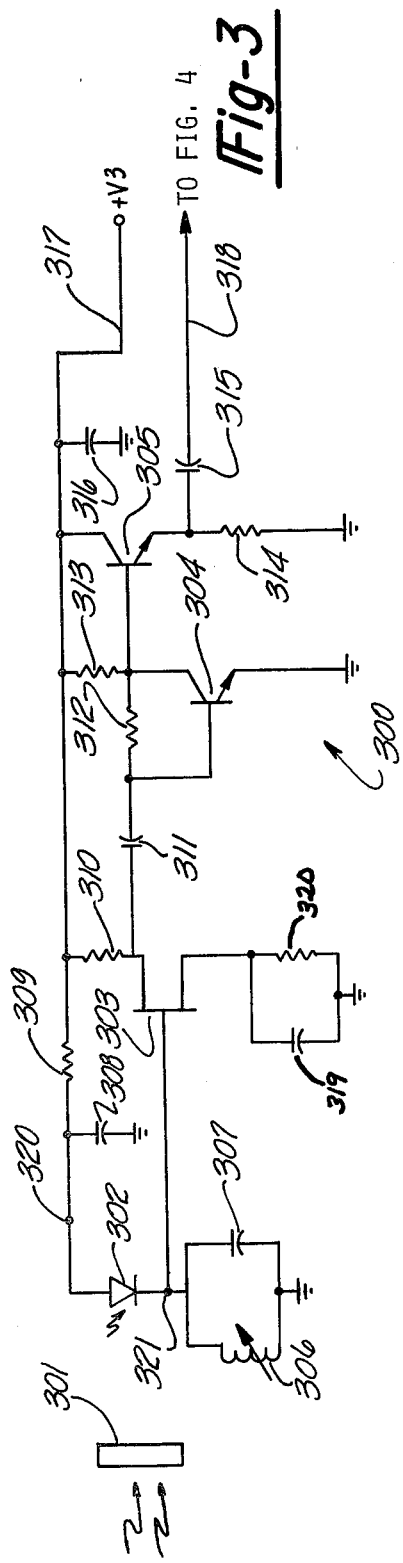
Fig-3
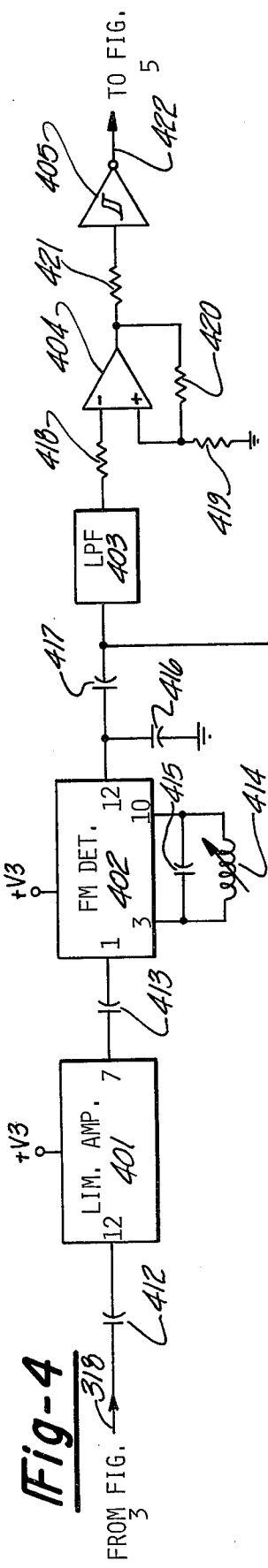
Fig-4
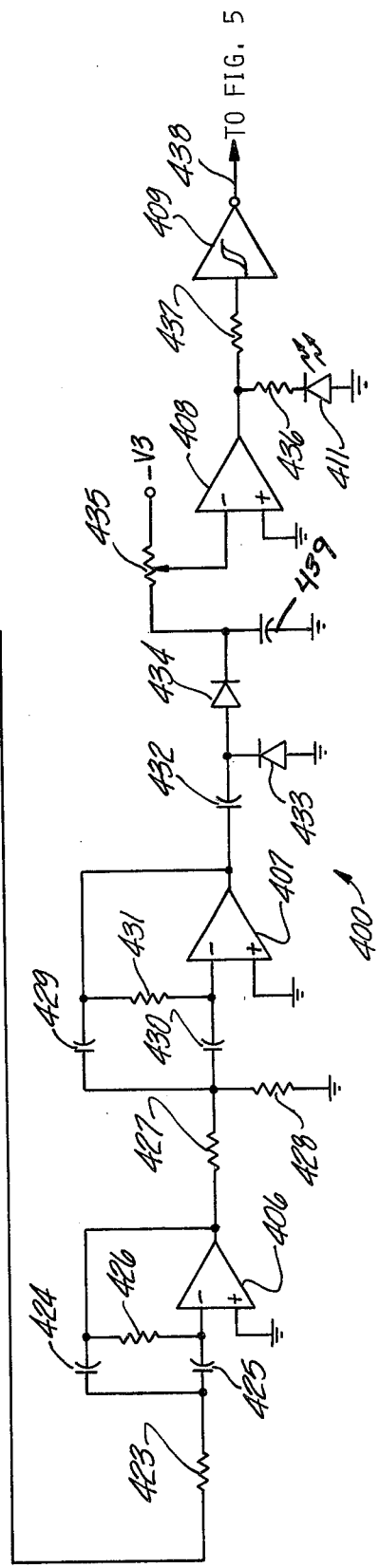

TELEMETRY GAGE SYSTEM

BACKGROUND OF THE INVENTION

1. Field of the Invention

The invention generally relates to electronic gaging systems. More specifically, the invention concerns in-process gaging apparatus for use with numerically controlled machine tools with wireless transmission or telemetering of the gaging data to a computer-controlled receiving unit.

2. Description of the Prior Art

In order to perform in-process dimensional gaging of workpieces being machined by a numerically controlled (NC) machine tool, it is necessary to employ some type of wireless transmission of gaging information from a gaging unit to a receiving unit. This necessity is due to the fact that the gaging unit must be configured for retention in the NC machine tool magazine similar to the actual cutting tools retained therein. Additionally, such a gage unit must be automatically selectable by the NC tool changing program. Hence hard wired coupling of the gage unit's output to a receiver and display unit is obviously not feasible.

One prior art approach to in-process gaging at an NC machining center is disclosed in U.S. Pat. No. 4,118,871—Kirkham, wherein a radio frequency signal is substantially attenuated by a gage probe's contact with workpiece and reference surfaces to indicate indirectly the spindle position of the numerically-controlled machine tool. This indirect method relies on the accuracy of the NC machine tool movement and no direct telemetering of measurement data from a gaging transducer is employed. Additionally, the radio frequency signal employed is susceptible to electromagnetic interference and must be used within a relatively short transmission distance between the gage head and a receiver.

Another prior approach, that of telemetering actual gage transducer measurement data via an antenna-coupled radio frequency signal, is taught in U.S. Pat. Nos. 3,670,243—Fougere et al. and 4,130,941—Amsbury. The above mentioned interference problem is not solved by this approach.

SUMMARY OF THE INVENTION

In accordance with this invention, an in-process gaging system for an NC machine tool comprises a battery powered gage unit, a receiving head, a main receiver unit, and a processing and display control unit. The gage unit is enclosed in a housing similar to the shape of the holders for the actual tools of the NC machine and is retained in the NC machine tool magazine when not in use. When selected for a gaging operation, the gage unit converts an electrical gage transducer signal into an infrared frequency modulated (FM) optical signal for wireless transmission to a receiving head. The receiving head filters the optical signal, converts the optical signal to a received electrical signal and couples the received electrical signal to the main receiver unit. The main receiver unit converts the FM received electrical signal into a digital signal for processing by a microcomputer-based processing and display control unit, which, in turn, converts the digital signal into control signals suitable for driving a visually perceptible display of the gage measurement data.

DRAWING

The objects and features of the invention will become apparent from a reading of a detailed description of a preferred embodiment, taken in conjunction with the drawing in which:

FIG. 1 presents a general gage system configured around an NC machine tool in accordance with the principles of the invention;

FIG. 2 presents a combined functional block and circuit diagram of a gage unit suitable for use with the system of the invention;

FIG. 3 depicts a combined functional block and circuit diagram of a receiver head suitable for use with the invention;

FIG. 4 is a combined functional block and circuit diagram of a main receiver unit configured in accordance with the principles of the invention.

DETAILED DESCRIPTION

Figure 1:
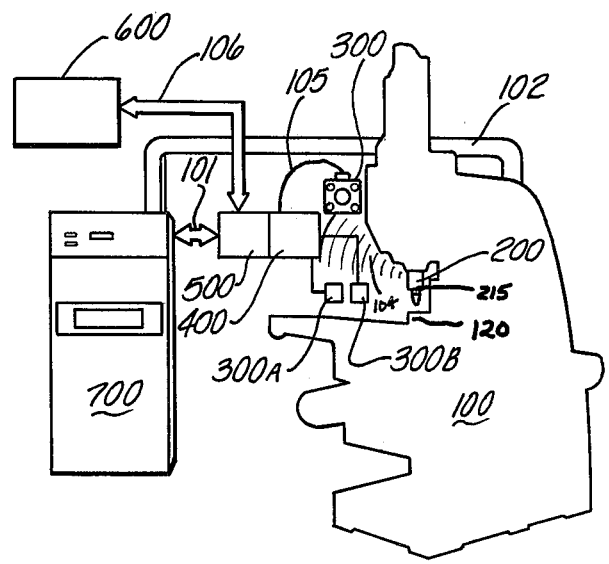

General System Configuration—FIG. 1

Referring to FIG. 1, a numerically controlled machining center 100 is shown with a battery operated gage unit 200 held for numerically controlled displacement in a spindle mounting 110 or the like. The gage unit is normally retained in the machine tool magazine (not shown) when not in use for measuring various dimensions of a workpiece 120.

Measurement data generated by a transducer in gage unit 200 is wirelessly transmitted via an LED array 215 in the form of frequency modulated (FM) infra-red optical signals 104 to a receiver head 300 where the optical signal is converted to an electrical signal amplified for transmission via path 105 to main receiver unit 400. Main receiver unit 400 converts the amplified electrical signal to a digital signal for transmission to processing and display control unit 500. Control unit 500 may be optionally coupled in a feedback or adaptive control mode via bus 101. Also, optional receiver heads 300A and 300B may be provided in those cases were multi-axis gaging is desired. Each axis would transmit gage data in a dedicated optical frequency band. One further optional feature depicted in FIG. 1 is a remote intelligent terminal 600 coupled to control unit by link 106, which, for example, could comprise a standard RS232 data transmission facility.

Also shown in FIG. 1 is the numerical control unit 700 of machine tool 100 coupled to the machine via control bus 102.

Figure 2:
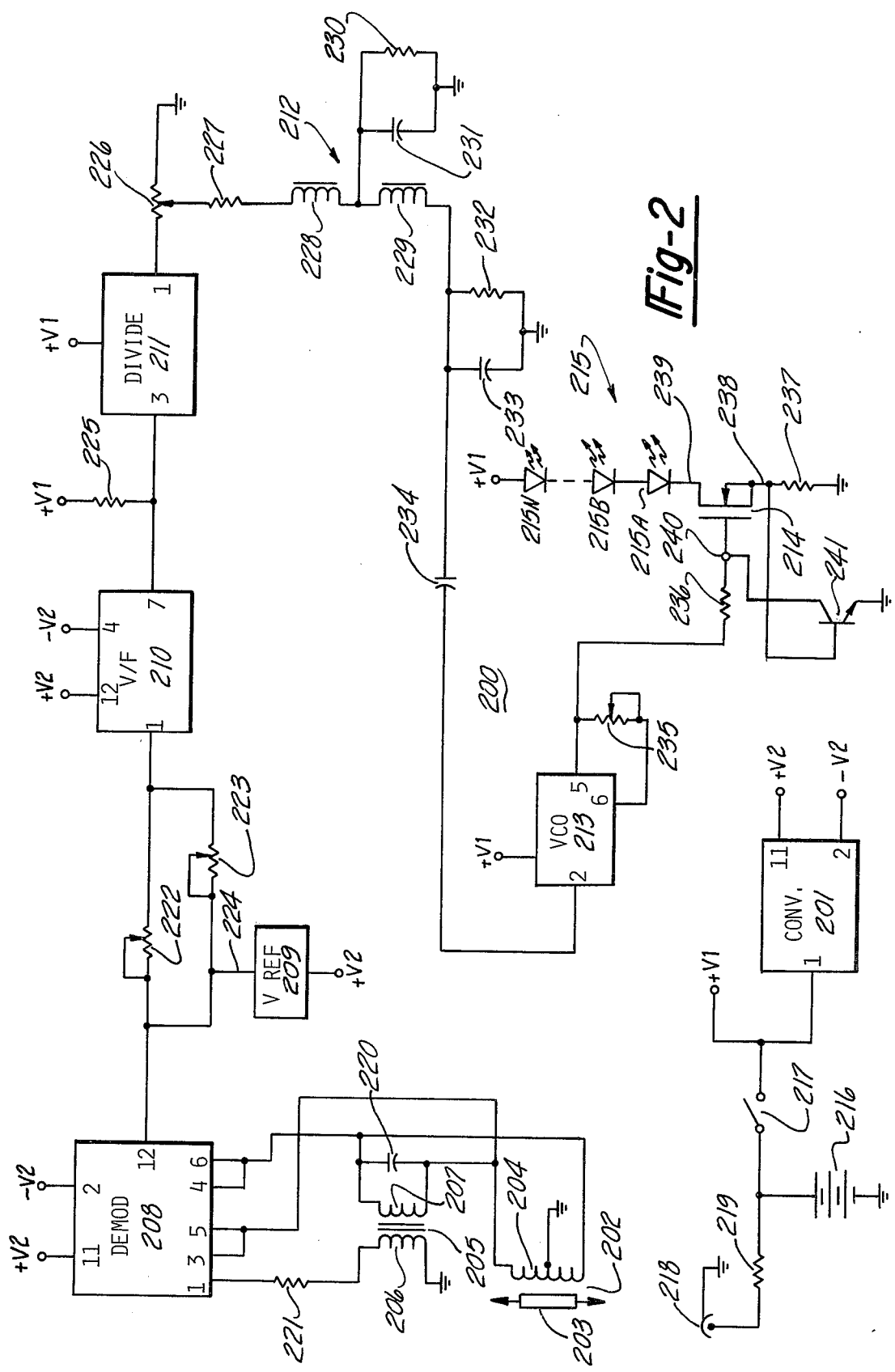

Gage Unit—FIG. 2

Apparatus contained in the gage unit housing 200 is shown in more detail in FIG. 2. Power for gage unit 200 is supplied from DC battery 216 via one or more mercury switches 217 to distribution points for the battery potential itself (V1) and for two additional potential levels, +V2 and −V2, via DC to DC converter 201. Converter 201 may, for example, comprise a model PM562 integrated circuit commercially available from Power Products Corp. Jack 218 is positioned to provide a source of external charging current to battery 216 via resistor 219. Mercury switches 217 are closed in response to a predetermined physical orientation of the axis of the gage unit housing, to prevent unnecessary battery drain when the gage unit is resting in an idle unused position in the NC machine tool magazine.

The transducer element employed in the preferred embodiment is a linear variable differential transformer (LVDT) 202 having a pole piece or slug 203 movable by the gaging contact points of the transducer and a center tapped transformer winding 204. One type LVDT transducer that would be employed is that described in a pending allowable U.S. patent application Ser. No. 75573, filed Sept. 14, 1979, and assigned to the same assignee as the instant invention. An excitation signal for transducer 202 is coupled from a demodulator unit 208 via resistor 221 and isolation transformer 205 comprised of primary winding 206 and secondary winding 207. Capacitor 220 is coupled across secondary winding 207. The transducer output signal is coupled to pins 3,5 and 4,6 of integrated circuit demodulator unit 208, which, for example, could be chosen as a model GPM 108, commercially available from Schaevitz Engineering of Camden, N.J.

Demodulator 208 converts the AC transducer input signal to a proportionate DC potential at its output terminal pin 12, which is coupled via potentiometer 222 to terminal pin 1 of voltage to frequency converter integrated circuit 210. Resistor 223 couples input terminal pin 1 of converter 210 to a precision voltage reference integrated circuit 209. Resistor 222 provides a signal span adjustment, while resistor 223 provides a zero level adjustment. Commercially available examples of integrated circuits 209 and 210 respectively are model AD581 from Analog Devices and model VFC32 from Burr-Brown.

Output terminal pin 7 of voltage to frequency converter 210 couples a pulse signal train having a frequency proportional to the output level of demodulator 208 to input terminal pin 3 of divide-by-two integrated circuit 211. Pull-up resistor 225 also couples the output of converter 210 to battery potential +V1. Divider 211 could, for example, comprise integrated circuit type MC14013 commercially available from Motorola. The output of divider 211 is coupled via FM deviation adjustment potentiometer 226 to a frequency filter 212 comprised of resistors 227 and 230, capacitor 231 and inductors 228 and 229. Frequency filter 212 is used to narrow the sidebands of a resultant FM electrical signal to be discussed below.

The output of filter 212 is coupled via a coupling network comprising resistor 232 and capacitors 233 and 234 to input terminal pin 2 of integrated circuit 213, which is a voltage controlled oscillator used herein as a modulated carrier frequency oscillator. Integrated circuit 213 could, for example, be comprised of type XR567, commercially available from EXAR. Using the frequency signal at terminal 2 as a modulating input, oscillator 213 provides an electrical signal modulated about a center carrier frequency at its output terminal pin 5. The carrier frequency is adjusted via potentiometer 235 coupled between terminal pins 5 and 6 of oscillator 213.

The FM electrical signal is converted to an FM optical infra-red signal by light emitting diode (LED) array 215 comprising LED's 215A, B, . . . N. The electrical FM signal is coupled via resistor 236 to a gate electrode of MOSFET 214 which controls light producing current conduction through the LED array in accordance with the frequency of the electrical signal being converted. The gate electrode of MOSFET 214 is also coupled to ground via the collector-emitter path of current limiting resistor 241. Transistor 241 provides a constant conduction current source for array 215 in conjunction with MOSFET 214. Drain electrode 239 is coupled to LED array 215, while source electrode 238 is coupled via load resistor 237 to ground. The base electrode of transistor 241 is coupled to the source electrode of MOSFET 214. LED array 215 may advantageously be placed in a 360 degree pattern about the periphery of the gage unit housing to enable a receiving head to be located at any direction in line of sight of the gage unit.

Receiver Head—FIG. 3

The apparatus of receiver head 300 is set forth in more detail in FIG. 3. The frequency modulated infra-red light signals emanating from the LED array at the gage unit are optically filtered by infra-red filter plate 301. Optically filtered signals then are directed to impinge upon a photo-diode 302, which, for example, could comprise a commercially available BP W34 PIN diode.

A tank circuit comprised of the parallel combination of variable inductor 306 and capacitor 307 is tuned to the center frequency of the received FM signal to provide low-frequency noise immunity at the receiver head. The tank circuit is coupled between ground potential and the cathode terminal of photodiode 302. Diode 302 converts the incident optical signal to an electrical signal coupled to a tuned input amplifier comprising field effect transistor 303, transistor 304 and accompanying passive elements comprised of resistors 309, 310, 320, 312, and 313, and capacitors 308, 319, and 311.

The anode electrode of diode 302 is coupled to a first terminal of resistor 309 and to ground potential via capacitor 308. The cathode electrode of diode 302 is additionally coupled to a gate electrode of FET 303. The tuned input amplifier is coupled to a source of potential +V3 at the juncture of resistors 309, 310, and 313. Filter capacitor 316 is coupled between the source +V3 and ground potential.

An amplified FM electrical signal is coupled from the tuned amplifier output to an emitter follower line driver circuit comprising transistor 305, resistor 314, and output coupling capacitor 315. The amplifier output at the collector electrode of transistor 304 is coupled to a base electrode of line driver transistor 305. A collector electrode of transistor 305 is coupled to source +V3, while an emitter electrode of transistor 305 is coupled via load resistor 314 to ground potential and to the receiver head output line 318 via coupling capacitor 315.

Main Receiver Unit—FIG. 4

The FM electrical signal carried by line 318 is coupled to a main receiver unit, shown in more detail in FIG. 4. Line 318 is coupled via capacitor 412 to input terminal pin 12 of limiting amplifier 401 which, for example, could be comprised of integrated circuit type UA 757, commercially available from Fairchild Semiconductor. Amplifier 401 is operative to minimize amplitude noise in the incoming FM signal.

The ouput of amplifier 401 at terminal pin 7 is coupled via capacitor 413 to input terminal pin 1 of FM detector 402, which, by way of example, could comprise integrated circuit type LM3075, commercially available from National Semiconductor. A tank circuit comprised of the parallel combination of variable inductor 414 and capacitor 415 is tuned to the center frequency of the FM signal and is coupled between terminal pins 3 and 10 of detector 402. FM detector 402 is basically a frequency to voltage converter operative to present substantially zero volts at its output terminal pin 12 whenever the frequency of the input signal equals the center frequency of the FM frequency range employed.

The output of detector 402 is coupled via capacitor 416 to ground and via capacitor 417 to a conventionally designed 4-pole low pass filter 403, which removes the higher frequency carrier signal from the frequency modulation components to present an electrical signal at its output having a frequency substantially the same as the signal at the output of the divider circuit 211 of the gage unit (FIG. 2).

This analog electrical output signal from low pass filter 403 is coupled to an operational amplifier 404 via resistor 418. Resistor 418 is coupled to an inverting input of amplifier 404. Resistor 419 is coupled between ground potential and a non-inverting input of amplifier 404. The non-inverting input is additionally coupled via resistor 420 to an output of amplifier 414. Amplifier 404 could, for example, comprise operational amplifier type TL084C, commercially available from Texas Instruments.

The amplified and clipped analog signal at the output of amplifier 404 is coupled to main receiver unit output 422 via resistor 421 and pulse shaping inverting amplifier 405, which could, for example, be chosen as a model 4584 Schmidt trigger, commercially available from Motorola. Hence a digital signal comprising a pulse train having a pulse repetition frequency corresponding to the original gage unit transducer measurement data signal is provided at the main receiver unit output for coupling to a processing and display control unit to be discussed in a later section of the specification.

With continued reference to FIG. 4, the output of FM detector 402 is additionally coupled via capacitor 417 to a noise detection and signal quality indication circuit generally comprising a combined noise signal amplifier and filter centered around operational amplifiers 406 and 407, a peak detector circuit comprised of diodes 433 and 434, a comparator utilizing operational amplifier 408, a carrier-present indicating LED 411, and an output signal shaping amplifier 409.

Amplifiers 406 and 407 and accompanying passive components comprised of resistors 423, 426, 427, 428 and 431 and capacitors 424, 425, 429, 430 and 432 essentially form a dual-section (4-pole) high pass filter tuned to a lower cut-off frequency well above the frequency of valid demodulated measurement signals appearing at the output of FM demodulator 402. The filter output at the output of amplifier 407 will be substantially zero as long as a high quality, relatively noise free FM signal is received. The peak value of the noise indicating signal at the output of amplifier 407 is detected by diodes 433 and 434 and appears across capacitor 439 which is coupled between the cathode terminal of diode 434 and ground potential. This peak value is compared with a reference potential proportional to $-V3$ which is coupled via potentiometer 435 to an inverting input of comparator amplifier 408.

A potential of negative polarity at the output of amplifier 408 indicates "carrier present," or good signal quality. The negative polarity signal will then cause light producing current to flow through LED 411 whose cathode terminal is coupled to the output comparator 408 via resistor 436 and whose anode terminal is coupled to ground potential. A quality indicating signal is coupled to receiver unit output 438 via resistor 437 and Schmidt trigger 409 for transmission to the processing and control unit of FIG. 5.

Figure 5:
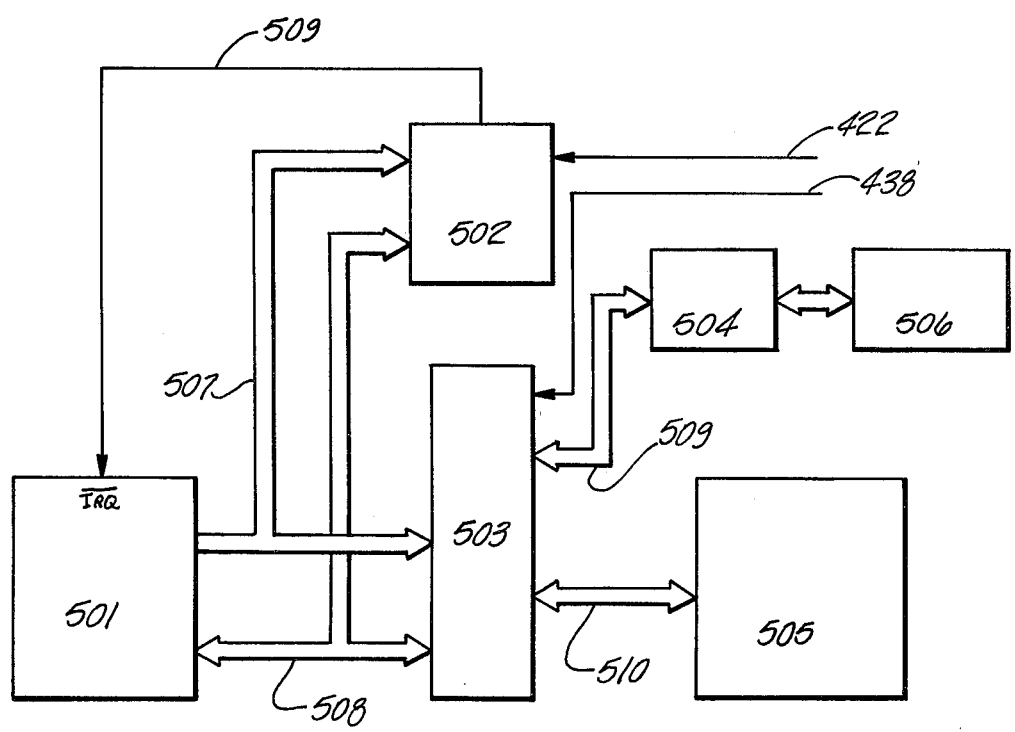
FIG. 5 is a functional block diagram of a microcomputer-based processing and display control unit suitable for use in accordance with the principles of the invention.

Processing and Display Control Unit—FIG. 5

The processing and display control unit is a microprocessor-based unit that accepts the digital signal and quality indicating signal from the main receiver unit and, as long as the quality indicating signal is present, converts the digital signal under microprocessor programmed control to control signals suitable for use in driving a visually perceptible display of the gaging data transmitted from the gage unit. The control unit additionally has the capability of processing the received and converted digital signal to transfer desired control-/information data back to the NC machine control unit via the optional bus 101 shown in FIG. 1.

A digital signal conversion is performed in conjunction with a programmable counting and timing circuit coupled to the microprocessor and comprises counting the number of pulses in the digital signal occuring within a predetermined time period. If, during a conversion, a digital signal becomes noisy, the quality indicating signal will change polarity informing the microprocessor that the display should be blanked.

An additional feature of the microprocessor is the capability of providing an auto-zeroing function wherein, when activated, the next converted digital signal value will be subtracted, via program, from subsequent signal conversions. If the auto zero function is invoked when the probe at the gage unit is deflected more than a given percentage of full scale, the processor may cause the display to flash thereby indicating an "out of range" condition.

Dual symmetric set point limits are available at the display in the form of thumbwheel switches having outputs coupled for receipt by the microprocessor.

With reference to FIG. 5, the principal elements of processing and display control unit 500 comprise microcomputer 501, programmable timer 502, peripheral interface adaptor 503, multiplexor and latch unit 504, display and display control 505, and thumbwheel switch input unit 506. Microcomputer 501 could, for example, comprise a Motorola MC6802 microprocessor and associated EPROM type MCM2716. Programmable timer 502 could, for example, comprise a Motorola MC6840 programmable timer unit. PIA 503 is, for example, comprised of one or more MC6821 units also available commercially from Motorola.

An address and chip select bus 507 couples microcomputer 501 to programmable timer and counter 502 and to peripheral interface adaptor (PIA) 503. Bidirectional data and miscellaneous control bus 508 likewise interconnects microcomputer 501, programmable counter and timer 502 and PIA 503. Thumbwheel switch inputs at 506 are coupled via bus 511, through multiplexor 504, thence via bus 509 to PIA 503 for subsequent reading by microcomputer 501 utilizing address bus 507 and data bus 508. In a similar manner, control signals are passed between PIA 503 and display unit 505 via bus 510.

Programmable timing and counting unit 502 includes a serial input first counter coupled for receipt of the digital signal carried by line 422 and an additional counter loaded with an initial value by microcomputer 501 via data bus 508. The additional counter counts down autonomously to zero, at which time an interrupt request signal is sent via path 509 to the IRQ input of microcomputer 501, which, in turn, causes microcomputer 501 to read the contents of the first counter in programmable timer and counter 502 thereby completing the conversion of the digital signal appearing at path 422.

A signal quality indicating signal at path 438 is periodically read at PIA 503 by microcomputer 501 via data bus 508. If this signal is not present, microcomputer 501 causes the display to blank-out via control signals coupled to display unit 505 via data bus 508, PIA outputs 503 and bus 510.

CONCLUSION

The telemetry gaging system disclosed herein, while preferably utilizing infra-red optical telemetry data transmission, is easily adapted to the optional use of antenna-coupled radio frequency data transmission for those applications where placement of a receiver head in the line of sight of the gage head transmitter is not feasible. For example, replacement of the circuit elements 214, 241, 237, and 215 of FIG. 2 by a transmitting antenna at point 240, along with replacement of optical filter 301 and photodiode 302, of FIG. 3 by a receiving antenna, would readily adapt the disclosed system to use with radio frequency data transmission.

It should be noted that the invention described herein has been illustrated with reference to a particular embodiment. It is to be understood that many details used to facilitate the description of such a particular embodiment are chosen for convenience only and without limitation on the scope of the invention. Many other embodiments may be devised by those skilled in the art without departing from the principles of the invention. Accordingly, the invention is intended to be limited solely by the scope and spirit of the appended claims.

What is claimed is:

1. Apparatus for performing in-process gaging of an object undergoing machining at a numerically controlled machine tool comprising:
    gaging means having a housing adapted for removable retention in a tool magazine of the numerically controlled machine and for automated selection from the magazine and insertion into a machine tool device movable relative to the object via numerical control, the gaging means including transducer means for generating an electrical signal proportional to displacement of the transducer means caused by a physical characteristic of the object, and means for converting the electrical signal to an infra-red optical signal of predetermined frequency,
    means for remotely wirelessly receiving and converting the optical signal to a digital signal related to displacement of the transducing means, and
    control means responsive to the digital signal to provide a visually perceptible display thereof.

2. Apparatus as set forth in claim 1 further including DC battery means located in the gaging means housing, and means for coupling the DC battery means to the gaging means including switching means responsive to an orientation of the housing in the tool magazine to electrically disconnect the battery means from the gaging means and responsive to an orientation of the housing when inserted into the movable machine tool device to electrically connect the battery means to the gaging means.

3. Apparatus as set forth in claim 1 wherein the transducer means comprises a linear variable differential transformer, demodulator means having an input coupled to the transformer output operative to generate a voltage signal at a demodulator means output proportional to a transformer output signal, a voltage to frequency converter having an input coupled to the demodulator means output operative to generate a converter output signal having a frequency proportional to the voltage at the converter input, and a modulated carrier frequency oscillator having an input coupled to the converter output operative to generate a frequency modulated signal at its output, the modulation being proportional to a signal frequency received from the voltage to frequency converter.

4. Apparatus as set forth in claim 1 wherein the means for converting the electrical signal to an infra-red optical signal comprises switching means having a control input coupled to the output of the transducer means, and a plurality of infra-red light emitting diodes coupled to the switching means, the switching means operative as connected to permit light generating current conduction through the plurality of light emitting diodes in accordance with the electrical signal coupled to the control input.

5. Apparatus as set forth in claim 4 wherein the infra-red light emitting diodes are positioned around a periphery of the gaging means housing in a manner providing for emission of the optical signal in substantially a 360° pattern in a plane substantially normal to an axis of the housing.

6. Apparatus as set forth in claim 3 wherein the means for remotely wirelessly receiving and converting the optical signal comprises an optical infra-red filter positioned for receipt of the optical signal, a PIN diode coupled for receipt of a filtered output signal from the optical filter operative to generate a received electrical signal proportional to the optical signal, and frequency modulation detection means coupled for receipt of the received electrical signal operative to generate the digital signal.

7. Apparatus as set forth in claim 6 further including noise level detection means coupled to an output of the frequency modulation detection means operative to generate a quality indicating signal of a predetermined polarity whenever a noise signal less than a predetermined magnitude is present at the frequency modulation detection means output.

8. Apparatus as set forth in claim 7 wherein the control means comprises:
    progrmmable timing and counting means coupled for receipt and accumulation of the digital signal,
    a microcomputer coupled for data communication with the programmable timing and counting means,
    peripheral interface means coupled for data communication with the microcomputer and coupled for receipt of the quality indicating signal,
    display means coupled to the peripheral interface means,
    the programmable timing and counting means operative to generate an interrupt at the microcomputer at the end of a predetermined time interval to cause the microcomputer to read the digital signal accumulated in the programmable timing and counting means,
    the microcomputer further including means responsive to the read digital signal to couple signals to the display means via the peripheral interface means causing the display means to provide a perceptible indication of the digital signal value.

9. Apparatus as set forth in claim 8 wherein the microcomputer further comprises means responsive to an absence of the quality indication signal at the peripheral interface means, operative to inhibit the display means for the duration of the absence via a blanking signal coupled to the display means via the peripheral interface means.

10. Apparatus as set forth in claim 8 wherein the microcomputer further includes means for determining that a current accumulated digital signal value is to be subtracted from subsequent digital signal values accumulated in the programmable timing and counting means, thereby invoking an auto-zeroing function.

* * * * *